(12) United States Patent
Gu

(10) Patent No.: US 12,337,924 B1
(45) Date of Patent: Jun. 24, 2025

(54) STRUCTURE OF ADJUSTABLE EXTENSION HANDLEBAR

(71) Applicant: TIEN HSIN INDUSTRIES CO., LTD., Taichung (TW)

(72) Inventor: Fong-syuan Gu, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 0 days.

(21) Appl. No.: 18/616,709

(22) Filed: Mar. 26, 2024

(51) Int. Cl.
*B62K 21/12* (2006.01)

(52) U.S. Cl.
CPC .................................. *B62K 21/125* (2013.01)

(58) Field of Classification Search
CPC .................................................... B62K 21/125
See application file for complete search history.

(56) References Cited

U.S. PATENT DOCUMENTS

| 7,213,485 | B2* | 5/2007 | Huang | B62K 21/125 |
| | | | | 74/551.8 |
| 10,160,510 | B1* | 12/2018 | Salazar | B62K 21/125 |
| 11,235,835 | B2* | 2/2022 | Bigard | B62K 21/16 |

* cited by examiner

*Primary Examiner* — Vicky A Johnson
(74) *Attorney, Agent, or Firm* — Nathan & Associates Patent Agents Ltd.; Menachem Nathan

(57) ABSTRACT

A structure of an adjustable extension handlebar is provided. The structure comprises an extension module and a griping module. The extension module comprises an extension body having an extension portion and a fixing portion. The extension portion extends from the fixing portion in a direction away from a handlebar. The griping module comprises a base and a griping body. A gap is formed between the base and the griping body, and the base and the griping body are connected through a first fastener. A distance and a rotation angle between the griping body and the base are adjustable, so that the griping body can more closely match palm shapes of different users.

11 Claims, 6 Drawing Sheets

STRUCTURE OF ADJUSTABLE EXTENSION HANDLEBAR

FIELD OF INVENTION

The present disclosure relates to a structure of an extension handlebar, in particular to a structure of an adjustable extension handlebar for a bicycle.

BACKGROUND OF INVENTION

In bicycle racing, there are two riding postures for users, one of which is a general posture with his hands on the handlebars; the other is a posture where the forearms are resting on the cushions and the hands are on the extension handlebars, which is used to maintain cruise control and improve aerodynamics.

Generally, there are two extension handlebars installed on the handlebars. Each extension handlebar has an area at the forward end for the user to grip. Two cushions are associated with the extension handlebars. The cushions act as a support for the user's front arms when the user places his hands on the griping area of the extension handlebars.

Specifically, an example is the bicycle aero handlebar assembly described in U.S. Pat. No. 8,172,247, which includes a pair of extension handlebar. Each extension handlebar is fixed to the bicycle handlebar, and the armrest is fixed to each extension handlebar and moves backward with respect to the bicycle handlebar. An example is the supplemental set of handlebars for bicycle described in US Patent No. US2010/0326232, which includes a monobloc plate, wherein the H shape integrates two extension handlebars and two associated armrests into one, and the monobloc plate can be fixed to the bicycle handlebar. Another example is the aerodynamic component of a bicycle handlebar disclosed in U.S. Pat. No. 11,235,835, which includes two extension handlebars, wherein the second extension-forming part of each extension handlebar is longitudinally slidable relative to the longitudinal extension to allow adjustment of the separation distance between a free end of the second extension-forming part and the first armrest-forming part.

In order to cooperate with the support of the user's front arm, the above-mentioned extension handlebar is designed to slide longitudinally forward or backward. At the same time, in U.S. Pat. No. 11,235,835, the griping of the handlebar can also be rotated upward or downward to correspond to different angles of the longitudinal plane. However, in the conventional technology, the griping of the handlebar still cannot be rotated left or right to correspond to different angles of the transverse plane, nor can the longitudinal distance of the handlebar be further finely adjusted. It causes the user to grip the handlebar on a griping surface that does not meet ergonomic and aerodynamic conditions.

As a result, it is necessary to provide a structure of adjustable extension handlebar to solve the problems existing in the conventional technologies, as described above.

SUMMARY OF INVENTION

One object of the present disclosure is to provide a structure of adjustable extension handlebar. By adjusting the distance between a griping body and a base and changing a rotation angle of the griping body, it can cause that the griping body more closely match the palm shapes of different users.

According to the aforementioned object, a structure of an adjustable extension handlebar for mounting on a handlebar is provided. The structure of the adjustable extension handlebar comprises an extension module and a griping module. The extension module comprises an extension body, wherein the extension body comprises an extension portion and a fixing portion, the extension portion extends from the fixing portion in an extension direction away from the handlebar, and the extension body is connected to the handlebar by the fixing portion. The griping module comprises a base and a griping body, wherein a gap is formed between the base and the griping body, the base and the griping body are connected through a first fastener, and the griping body is configured for a user to grip. The base is pivotally connected to the extension portion with a first pivot being not parallel to the extension direction, so that the base is rotated along the first pivot, and the gap is closer to the griping body than the first pivot.

According to an embodiment of the present disclosure, the base comprises a base body, a joint portion, and a plurality of first joint structures, the first joint structures are disposed on one side of the base body, and the joint portion is connected on the extension portion through a second fastener.

According to an embodiment of the present disclosure, at least one spacer is disposed in the gap of the griping module, the spacer comprises a connecting portion and at least one first positioning element, and the at least one first positioning element is configured to fit into the corresponding first joint structure.

According to an embodiment of the present disclosure, a slot is formed in the at least one spacer, and the first fastener passes through the slot while the spacer is located in the gap.

According to an embodiment of the present disclosure, the griping body comprises a pedestal and at least one second positioning element, the at least one second positioning element is disposed on a side of the pedestal facing the base, the spacer further comprises at least one second joint structure, the at least one second joint structure and the at least one first positioning element are located on two opposite sides of the spacer, and the at least one second positioning element is configured to fit into the at least one second joint structure.

According to an embodiment of the present disclosure, the griping body further comprises a griping portion, the griping portion extends upward from the pedestal, and a direction of extension is not parallel to a plumb line.

According to an embodiment of the present disclosure, the griping body comprises a recessed portion formed at a bottom of the griping portion, and the recessed portion is configured to accommodate a finger portion of a user.

According to an embodiment of the present disclosure, the griping body further comprises a protruding portion extending outward from a top surface of the pedestal, and the protruding portion is configured to support a finger portion of a user.

According to an embodiment of the present disclosure, the first fastener extends through the pedestal and the spacer to engage with the base.

According to an embodiment of the present disclosure, the griping body further has a bearing surface formed between the griping portion and the pedestal, and the bearing surface is configured to bear the finger portion of the user.

According to an embodiment of the present disclosure, a bending portion is provided between the fixing portion and the extension portion, so that a bending angle is formed between the fixing portion and the extension portion.

According to an embodiment of the present disclosure, the extension module further comprises a first combination base, a second combination base, and a cushion. The first combination base comprises a first coupling portion configured to be coupled to the handlebar. The second combination base comprising a second coupling portion configured to be coupled the fixing portion. The cushion is assembled on the second combination base, wherein the cushion is configured to accommodate an arm of a user.

As described above, the structure of adjustable extension handlebar of the present disclosure can adjust the distance between the griping body and the base through the first fastener, and the griping body is rotated left or right along the second pivot to correspond to different rotation angles of the transverse plane, so that the griping body can more closely match the palm shapes of different users, thereby allowing the user to griping the griping body on a griping surface determined to meet ergonomic and aerodynamic conditions.

DETAILED DESCRIPTION OF PREFERRED EMBODIMENTS

In order to make the above and other objects, features, and advantages of the present disclosure more comprehensible, preferred embodiments of the present disclosure will be described below in detail together with the attached drawings. Furthermore, the directional terms used in the present disclosure, for example, up, down, top, bottom, front, back, left, right, inside, outside, side, around, central, horizontal, transverse, vertical, longitudinal, axial, radial direction, the uppermost layer, or the lowermost layer, etc. are only the directions shown in the attached drawings. Therefore, the directional terms are only used to illustrate and express the present disclosure, but not to limit the present disclosure.

Figure 1:
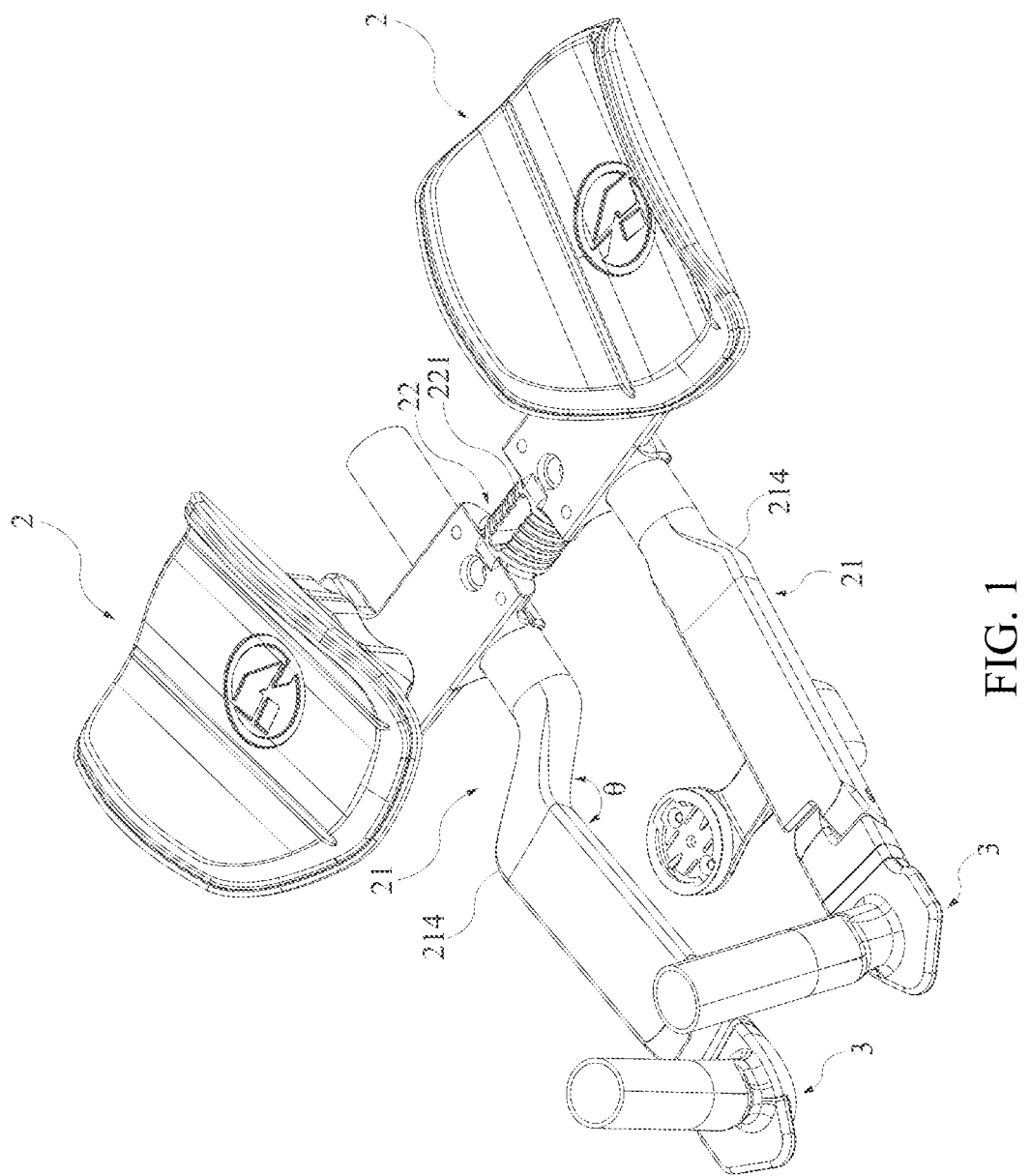
FIG. 1 is a schematic view of a structure of an adjustable extension handlebar according to an embodiment of the present disclosure.
Figure 2:
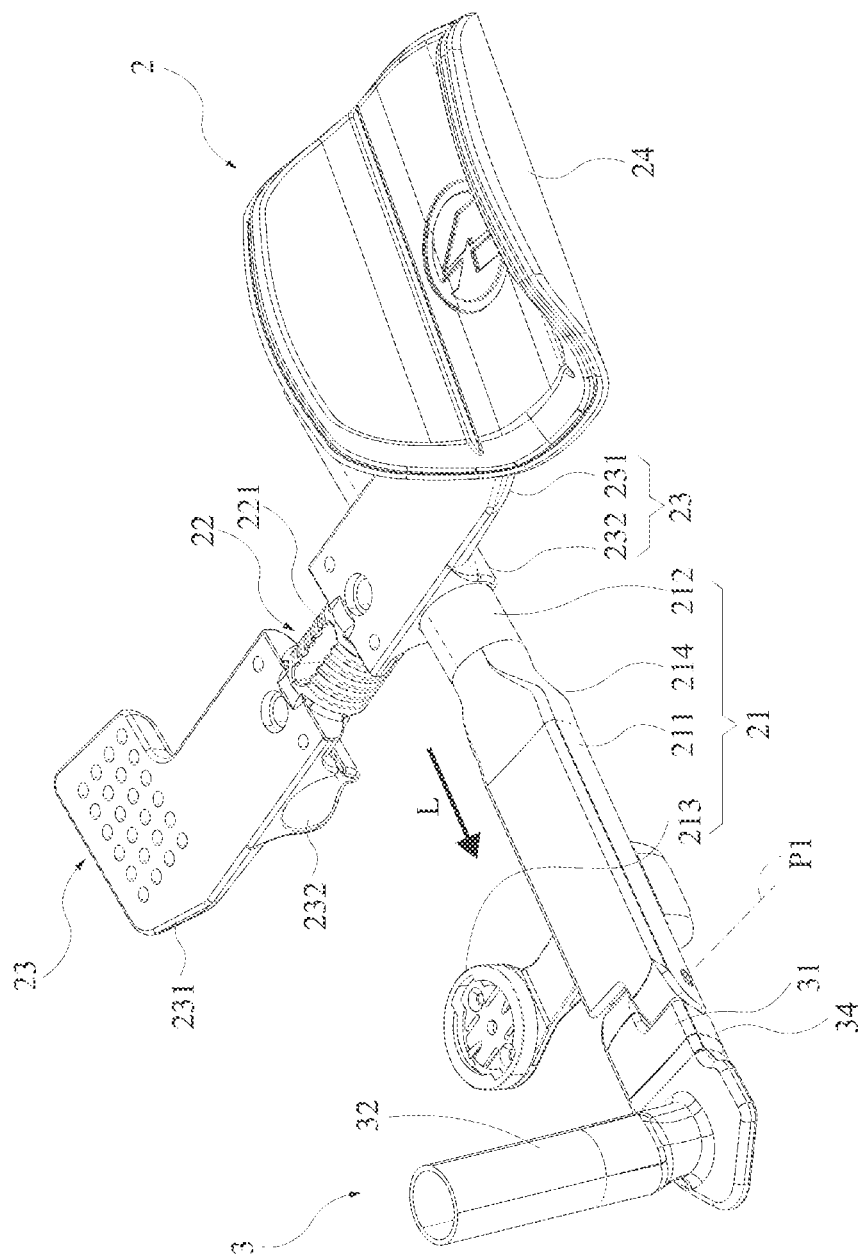
FIG. 2 is a schematic view of partial components of a structure of an adjustable extension handlebar according to an embodiment of the present disclosure.

Please refer to FIG. 1 and FIG. 2, a structure of an adjustable extension handlebar for mounting on a handlebar (not shown) according to an embodiment of present disclosure is illustrated. The structure of the adjustable extension handlebar comprises an extension module 2 and a griping module 3. The detailed structure of each component, assembly relationships, and principles of operation in present disclosure will be described in detail hereinafter.

Figure 3:
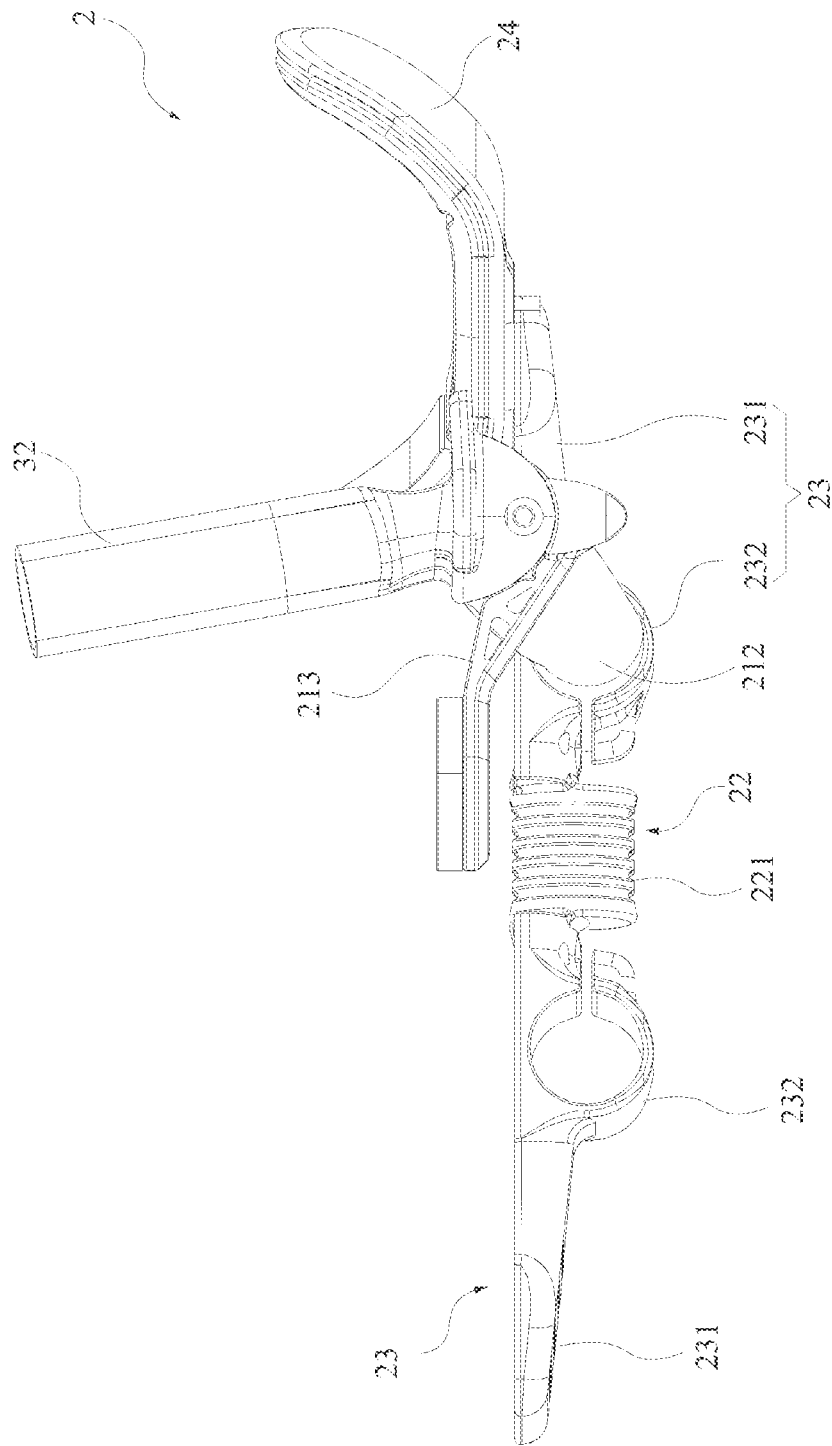
FIG. 3 is a schematic view of a structure of an adjustable extension handlebar from another perspective according to an embodiment of the present disclosure.

Please refer to FIG. 1, FIG. 2, and FIG. 3, The extension module 2 comprises an extension body 21. The extension body 21 comprises an extension portion 211, a fixing portion 212, and an accessory rack 213. The extension portion 211 extends from the fixing portion 212 in an extension direction L away from the handlebar. The accessory rack 213 is assembled on the extension portion 211.

In the embodiment, the accessory rack 213 is assembled at a bottom of the extension body 21, and the accessory rack 213 is located on one side of the extension body 21 away from the fixing portion 212. The extension portion 211 and the fixing portion 212 are integrally formed.

Furthermore, in the embodiment, a bending portion 214 is provided between the fixing portion 212 and the extension portion 211. A bending angle θ is formed between the fixing portion 212 and the extension portion 211 through disposing the bending portion 214. Thereby, the extension portion 211 can be more ergonomic. However, in other embodiments, the bending portion 214 may not be provided, and the extension portion 211 and the fixing portion 212 can extend along the same extending direction L.

Figure 4:
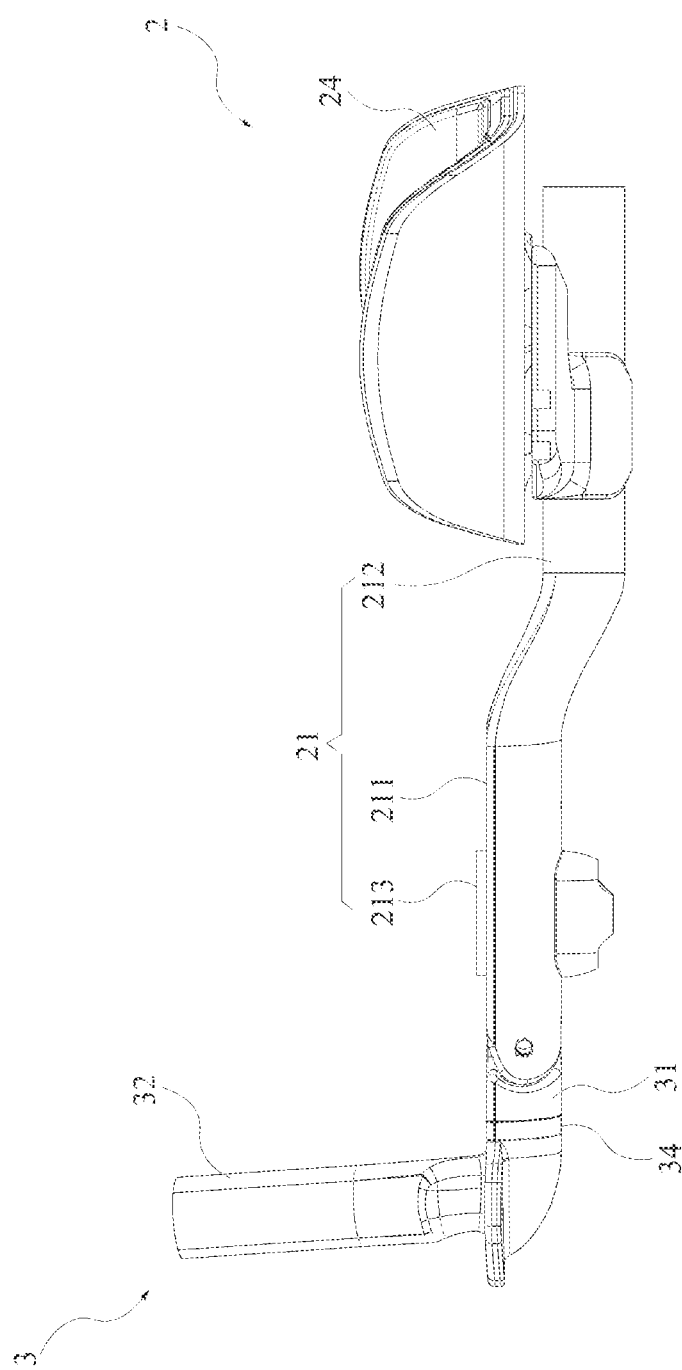
FIG. 4 is a side view of a structure of an adjustable extension handlebar according to an embodiment of the present disclosure.
Figure 5:
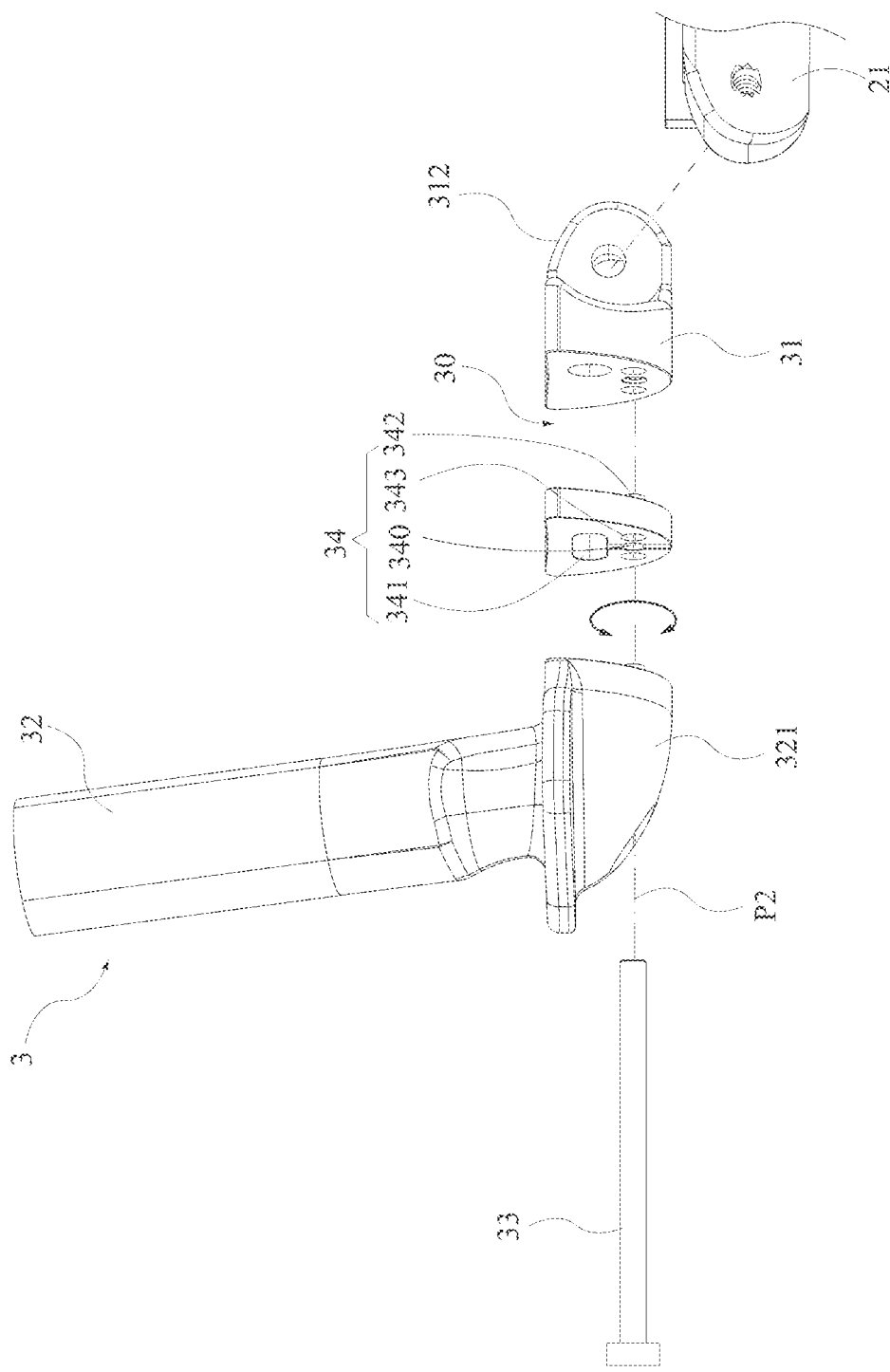
FIG. 5 is an exploded view of a structure of an adjustable extension handlebar according to an embodiment of the present disclosure.

Please refer to FIG. 4 and FIG. 5, the griping module 3 comprises a base 31, a griping body 32, a first fastener 33, and a gap 30. The base 31 and the griping body 32 are connected through the first fastener 33. The gap 30 is formed between the base 31 and the griping body 32, so that a separation distance is defined between the base 31 and the griping body 32. Specifically, the griping body 32 is configured to be held by a user. As shown in FIG. 1, the base 31 is pivotally connected to the extension portion 211 of the extension body 21 with a first pivot P1 being not parallel to the extension direction L, so that the base 31 of the griping module 3 is rotated along the first pivot P1, and the gap 30 is closer to the griping body 32 than the first pivot P1. In the embodiment, the extension direction L intersects the first pivot P1.

Figure 6:
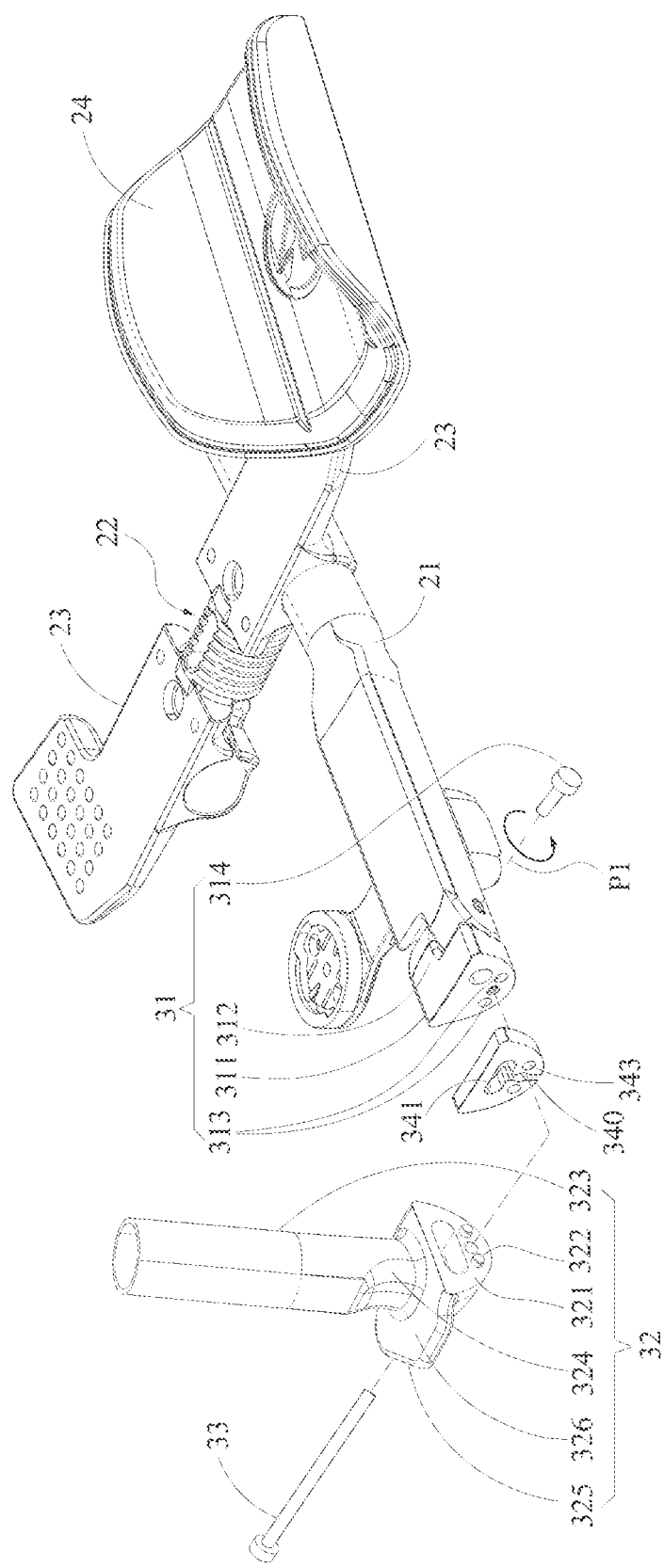
FIG. 6 is an exploded view of a structure of an adjustable extension handlebar from another perspective according to an embodiment of the present disclosure.

Moreover, as shown in FIG. 6, the base 31 comprises a base body 311, a joint portion 312, a plurality of first joint structures 313, and a second fastener 314. The joint portion 312 is disposed on one side of the base body 311 close to the extension portion 211 of the extension body 21. The first joint structures 313 are disposed on one side of the base body 311, wherein the side where the joint portion 312 is located is opposite to the side where the first joint structures 313 are located.

In the embodiment, the joint portion 312 is connected on the extension portion 211 through the second fastener 314, so that the joint portion 312 can rotate relative to the extension portion 211 along the first pivot P1.

Please refer to FIG. 5 and FIG. 6, the griping module 3 further comprises at least one spacer 34, and the at least one spacer 34 is disposed in the gap 30. The spacer 34 comprises a connecting portion 341, at least one first positioning element 342, and at least one second joint structure 343. The connecting portion 341 has an opening shape and passes through the center of the spacer 34. The at least one first positioning element 342 is disposed on a surface of the spacer 34, and the at least one first positioning element 342 is configured to fit with the corresponding first joint structure 313. The at least one second joint structure 343 and the at least one first positioning element 342 are located on two opposite sides of the spacer 34. Specifically, the at least one spacer 34 is further provided with a slot 340 extending from the connecting portion 341 to the edge. The first fastener 33 of the griping module 3 passes through the slot 340 while the spacer 34 is located in the gap 30.

In the embodiment, one spacer 34 is provided in the gap 30. In other embodiments, multiple spacers 34 may be provided in the gap 30, or no spacer 34 may be provided. Thus, the number of the spacers 34 is not limited to the embodiments. In addition, when the first fastener 33 passes through the griping body 32 and is locked into the base 31. The spacer 34 is detachably placed in the gap 30 so that the first fastener 33 is located in the slot 340.

Please refer to FIG. 6, the griping body 32 comprises a pedestal 321, at least one second positioning element 322, a griping portion 323, a recessed portion 324, a protruding portion 325, and a bearing surface 326. The at least one second positioning element 322 is disposed on a lateral surface of the pedestal 321 facing the base 31 of the griping module 3, and the at least one second positioning element 322 is configured to fit into the at least one second joint structure 343.

Please refer to FIG. 6, the griping portion 323 extends upward from the pedestal 321, the recessed portion 324 is formed at a bottom of the griping portion 323, and the recessed portion 324 is configured to accommodate a finger portion of the user. The protruding portion 325 extends outward from a top surface of the pedestal 321, and the protruding portion 325 is configured to support the finger portion of the user. The bearing surface 326 is formed between the griping portion 323 and the pedestal 321, and the bearing surface 326 is configured to bear the finger portion of the user.

In the embodiment, the first fastener 33 extends through the pedestal 321 and the spacer 34 of the griping body 32 to lock on the base 31. The bearing surface 326 is a concave arc-shaped surface, and one end edge of the protruding portion 325 has a convex arc-shaped surface.

Please refer to FIG. 1, FIG. 2, and FIG. 3, the extension module 2 further comprises a first combination base 22, two second combination bases 23, and two cushion 24, wherein the first combination base 22 comprises a first coupling portion 221 configured to be coupled to the handlebar or a bicycle riser (now shown). Each second combination base 23 comprises a second base body 231 and a second coupling portion 232 disposed on a bottom surface of the second base body 231. In other embodiments, the second coupling portion 232 is disposed on other positions according to the design of the second base body 231, not limited to the bottom surface, and the second coupling portion 232 is fitted on the fixing portion 212 of the extension body 21. The cushion 24 is assembled on the second base body 231 of the second combination base 23, and the cushion 24 is configured to accommodate an arm of the user.

According to the described structure, the base 31 and the griping body 32 are separated by the gap 30 of the griping module 3, and the first fastener 33 is passed through the gap 30 to fasten the base 31 on the griping body 32, wherein a locking length of the first fastener 33 can be adjusted to modify the separation distance between the griping body 32 and the base 31. At the same time, before the first fastener 33 is locked, the griping body 32 can be adjusted to rotate left or right along a second pivot P2 to correspond to different rotation angles in a transverse plane (intersecting the extension direction L). By disposing the at least one spacer 34 in the gap 30, the griping body 32 can be adjusted more carefully for different palm shapes. Moreover, the joint portion 312 of the base 31 is connected on the extension portion 211 through the second fastener 314, so that the base 31 can be rotated upward or downward along the first pivot P1 to correspond to different rotation angles in a longitudinal plane (parallel to the extension direction L).

As described above, the structure of the adjustable extension handlebar of the present disclosure can adjust the distance between the griping body 32 and the base 31 through the first fastener 33, and the griping body 32 is rotated left or right along the second pivot P2 to correspond to different rotation angles of the transverse plane, so that the griping body 32 can more closely match the palm shapes of different users, thereby allowing the user to grip the griping body 32 on a griping surface determined to meet ergonomic and aerodynamic conditions.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

The invention claimed is:

1. A structure of adjustable extension handlebar for mounting on a handlebar, comprising:
    an extension module comprising an extension body, wherein the extension body comprises an extension portion and a fixing portion, the extension portion extends from the fixing portion in an extension direction away from the handlebar, and the extension body is connected to the handlebar by the fixing portion; and
    a griping module comprising a base and a griping body, wherein a gap is formed between the base and the griping body, the base and the griping body are connected through a first fastener, and the griping body is configured for a user to grip;
    wherein the base is pivotally connected to the extension portion with a first pivot being not parallel to the extension direction, so that the base is rotated along the first pivot, and the gap is closer to the griping body than the first pivot;
    wherein the base comprises a base body, a joint portion, and a plurality of first joint structures, the joint portion is arranged on one side of the base body, the first joint structures are disposed on one side of the base body, and the joint portion is connected on the extension portion through a second fastener.

2. The structure of adjustable extension handlebar according to claim 1, wherein at least one spacer is disposed in the gap of the griping module, the spacer comprises a connecting portion and at least one first positioning element, and the at least one first positioning element is configured to fit into the corresponding first joint structure.

3. The structure of adjustable extension handlebar according to claim 2, wherein a slot is formed in the at least one spacer, and the first fastener passes through the slot while the spacer is located in the gap.

4. The structure of adjustable extension handlebar according to claim 2, wherein the griping body comprises a pedestal and at least one second positioning element, the at least one second positioning element is disposed on a side of the pedestal facing the base, the spacer further comprises at least one second joint structure, the at least one second joint structure and the at least one first positioning element are located on two opposite sides of the spacer, and the at least one second positioning element is configured to fit into the at least one second joint structure.

5. The structure of adjustable extension handlebar according to claim 4, wherein the griping body further comprises a griping portion, the griping portion extends upward from the pedestal, and a direction of extension is not parallel to a plumb line.

6. The structure of adjustable extension handlebar according to claim 4, wherein the griping body comprises a recessed portion formed at a bottom of the griping portion, and the recessed portion is configured to accommodate a finger portion of the user.

7. The structure of adjustable extension handlebar according to claim 4, wherein the griping body further comprises a protruding portion extending outward from a top surface of the pedestal, and the protruding portion is configured to support a finger portion of the user.

8. The structure of adjustable extension handlebar according to claim 4, wherein the first fastener extends through the pedestal and the spacer to engage with the base.

9. The structure of adjustable extension handlebar according to claim 6, wherein the griping body further has a bearing surface formed between the griping portion and the pedestal, and the bearing surface is configured to bear the finger portion of the user.

10. The structure of adjustable extension handlebar according to claim 1, wherein a bending portion is provided between the fixing portion and the extension portion, so that a bending angle is formed between the fixing portion and the extension portion.

11. The structure of adjustable extension handlebar according to claim 1, wherein the extension module further comprises:
- a first combination base comprising a first coupling portion configured to be coupled to the handlebar;
- a second combination base comprising a second coupling portion configured to be coupled to the fixing portion; and
- a cushion assembled on the second combination base, wherein the cushion is configured to accommodate an arm of a user.

* * * * *